(12) United States Patent
Low et al.

(10) Patent No.: US 11,019,140 B1
(45) Date of Patent: May 25, 2021

(54) SYSTEMS AND METHODS FOR PEER-TO-PEER DATA EXCHANGE VIA MULTI-ACCESS EDGE COMPUTING

(71) Applicant: Verizon Patent and Licensing Inc., Arlington, VA (US)

(72) Inventors: Daryl M. Low, San Jose, CA (US); Donna L. Polehn, Mercer Island, WA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/681,435

(22) Filed: Nov. 12, 2019

(51) Int. Cl.
*H04L 29/08* (2006.01)
*H04L 29/06* (2006.01)

(52) U.S. Cl.
CPC ...... *H04L 67/1085* (2013.01); *H04L 65/1069* (2013.01)

(58) Field of Classification Search
CPC ................ H04L 67/1085; H04L 65/1069
See application file for complete search history.

(56) References Cited

U.S. PATENT DOCUMENTS

| 2013/0244614 | A1* | 9/2013 | Santamaria | H04W 12/0609 455/411 |
| 2018/0183855 | A1* | 6/2018 | Sabella | G06F 9/5027 |
| 2018/0270780 | A1* | 9/2018 | Xiong | H04W 8/22 |
| 2019/0342365 | A1* | 11/2019 | Vysotsky | G06T 7/90 |

OTHER PUBLICATIONS

Thesis "Multi-access edge computing assisted mobile ad-hoc cloud" (Sep. 5, 2019) to Bhuchhada. ("Bhuchhada") (Year: 2019).*
GitHub, Inc., "Scuttlebutt Protocol Guide", https://ssbc.github.io/scuttlebutt-protocol-guide/index.html, Jan. 10, 2018, 31 pages.

* cited by examiner

*Primary Examiner* — June Y Sison (57) ABSTRACT

A multi-access edge computing (MEC) node of a MEC network may receive, from a user device a first request to communicate via a peer-to-peer connection routed through a MEC network. The MEC node may identify one or more candidate devices that are available to communicate with the user device via the peer-to-peer connection. The MEC node may provide, to a particular candidate device of the one or more candidate devices, a second request to communicate via the peer-to-peer connection. The MEC node may receive, from the particular candidate device, an acceptance to communicate via the peer-to-peer connection. The MEC node may route data between the user device and the particular candidate device via the peer-to-peer connection.

20 Claims, 8 Drawing Sheets

SYSTEMS AND METHODS FOR PEER-TO-PEER DATA EXCHANGE VIA MULTI-ACCESS EDGE COMPUTING

BACKGROUND

Multi-access edge computing (MEC) is a network architecture of MEC resources (e.g., devices, applications operating on devices, and/or the like) that may operate at an edge of a cellular network. The MEC resources may perform operations of the cellular network for connected user devices that are within a coverage area of the MEC resources.

DETAILED DESCRIPTION OF PREFERRED EMBODIMENTS

The following detailed description of example implementations refers to the accompanying drawings. The same reference numbers in different drawings may identify the same or similar elements.

Multi-access edge computing (MEC) may provide benefits to a cellular network and to user devices that are connected to the cellular network. A user device may communicate with a MEC resource hosting a service to decrease latency of communications for the service. Additionally, communicating with the MEC resource may reduce an amount of communication via a core network of the cellular network. However, hosting a service on the MEC resource may consume computing resources (e.g., processor resources, memory resources, power resources and/or the like) of an associated MEC network, which may be limited. Additionally, if the cellular network includes a plurality of MEC networks for a plurality of geographical locations, instances of the service may be hosted on each of the plurality of MEC networks. Hosting an instance of the service on the MEC resource of each of the plurality of MEC networks may consume the limited computing resources of each of the plurality of MEC networks.

Some implementations described herein provide systems and methods for peer-to-peer data exchange via MEC. A MEC node of a MEC network may receive a request, from a user device, for a peer-to-peer connection via the MEC network. The request may identify an application programming interface (API) to be used to communicate via the peer-to-peer connection. The MEC node may perform one or more security checks before facilitating the peer-to-peer connection. For example, the MEC node may verify an identity of the user device using a device identifier provided by the user device. Additionally, or alternatively, the MEC node may verify the user device as an authenticated user of an application associated with the API.

The MEC node may identify one or more candidate devices that are available to communicate with the user device using the API via the peer-to-peer connection. For example, the MEC node may reference a lookup table of candidate devices that have communicated an indication of an availability to communicate using the API via a peer-to-peer connection of the MEC network. The MEC node may provide the first network node with an identification of the one or more candidate devices that the MEC node identified. Based on a selection, by the user device, of a particular candidate device of the one or more candidate devices, the MEC node may provide a request to the particular candidate device to communicate with the user device via the peer-to-peer connection. If the particular candidate device accepts, the MEC node may begin routing traffic between the user device and the particular candidate device for the peer-to-peer connection.

In some implementations, after the MEC node identifies the one or more candidate device that are available to communicate with the user device using the API via the peer-to-peer connection, the MEC node may provide information to the user device such that the user device can establish the peer-to-peer connection with the particular candidate device. The information may identify a MEC resource that can facilitate the peer-to-peer connection instead of having the MEC node facilitate the peer-to-peer connection.

By facilitating a peer-to-peer connection between the user device and the particular candidate device, the user device or the particular candidate device may host an instance of the application associated with the API. This may allow a service provider associated with the application to avoid consuming computing resources for installing custom software on the MEC network using protocols of the MEC network. Instead, the MEC node may be used as a discovery service, a connection service, and or the like rather than as a provider of the service associated with the application. This may also conserve computing resources of the MEC network that may otherwise be used to host an instance of a service associated with the application on the MEC resource of the MEC network. Additionally, by facilitating the peer-to-peer connection via the MEC network, the MEC node may perform one or more security checks before the peer-to-peer connection is established. This may conserve computing resources that may otherwise be used to recover from the user device establishing a peer-to-peer connection with a device of a malefactor.

FIGS. 1A-1E are diagrams of one or more example implementations 100 described herein. As shown in FIGS. 1A-1E, the example implementation(s) 100 may include a MEC node, a user device, a particular candidate device, one or more candidate devices, a MEC resource, and/or the like.

Figure 1A:
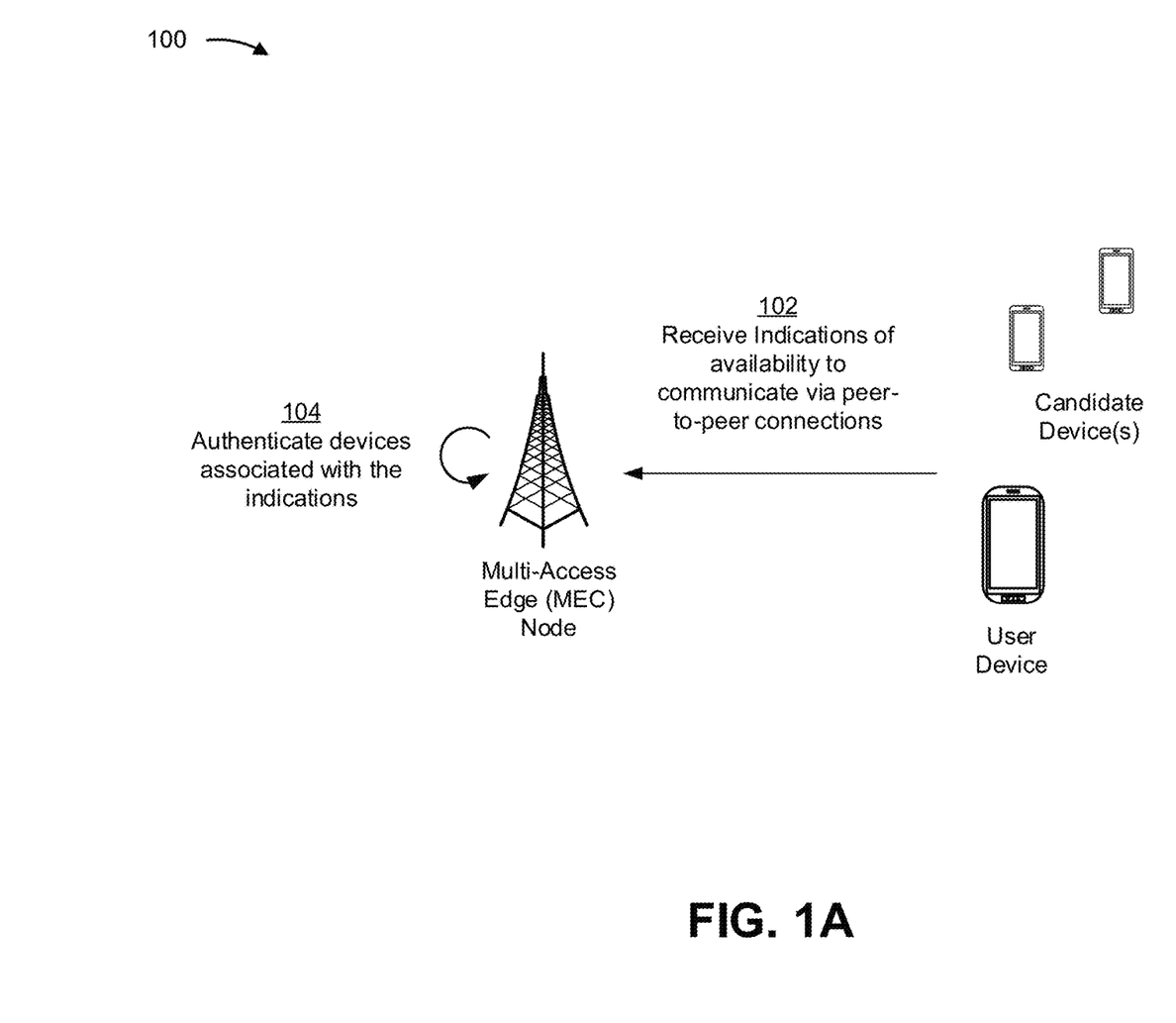
FIGS. 1A-1E are diagrams of one or more example implementations described herein.

The user device, the particular candidate device, the one or more candidate devices, and/or the like may establish a connection with the MEC network via the MEC node. For example, the MEC node may receive a request to connect to the MEC network from the user device. The request may include information (e.g., a device identifier, a license identifier, an authorization token, and/or the like) that the MEC node may use to determine whether the user device is authorized to connect to the MEC network. The MEC node may use the information to look up an authorization status of the user device in a local data structure, request an indication of the authorization status from another device, and/or the like.

If the MEC node determines that the user device is authorized to connect to the MEC network, the MEC node may provide, to the user device, an acceptance to the request. The MEC node may then establish a connection with the first network node. The particular candidate device, the one or more candidate devices, and/or the like may follow a similar process to establish a connection with the MEC network via the MEC node.

As shown in FIG. 1A, and by reference number 102, the MEC node may receive one or more indications (e.g., advertisements) of availability to communicate using an API from the user device, the one or more candidate devices (which may include the particular candidate device), and/or the like. In some implementations, an indication of the one or more indications may indicate whether an associated user device is available to communicate via a peer-to-peer connection, identify one or more MEC resources through which the associated user device is available, indicate one or more APIs that the associated user device may use to communicate via the peer-to-peer connection, and/or the like. For example, the user device may provide an indication that the user device is available to communicate via a peer-to-peer connection and may indicate the user device may communicate with one or more APIs based on a set of applications installed on the user device that are associated with the one or more APIs.

In some implementations, the indication may include a device identifier that identifies the associated user device. The device identifier may be globally unique. In some implementations, the associated user device may generate the device identifier using a device certificate encrypted with a private key, which may be stored in hardware of the associated user device. For example, the associated user device may generate the device identifier by performing a cryptographic hash of a device certificate.

By storing the private key within hardware of the associated user device (e.g., a component for storing private keys, a universal subscriber identity module, a smart card, a hardware security module, and/or the like), the device identifier is less likely to be stolen and misused. This may conserve computing resources that may otherwise be used to recover from fraudulent activity due to misuse of a stolen device identifier.

In some implementations, the associated user device (e.g., the user device, the one or more candidate devices, and/or the like) may register the device identifier, or another identification of the associated user device, with another entity. For example, the associated user device may provide the device identifier to an entity associated with the MEC network. If the associated user device subscribes to the MEC network, the entity associated with the MEC network may maintain an account for the associated user device with an indication of an authorization to use the MEC network.

In another example, the associated user device may provide the device identifier, or another identification of the associated user device, to a service provider (e.g., a service provider associated with an application that is associated with the one or more APIs). If the associated user device registers an application associated with the service provider, the service provider may maintain an account for the associated user device with an indication that the associated user device is an authenticated user of the application.

In some implementations, the associated user device may receive a certificate from another entity. For example, the associated user device may receive a network certificate from a device associated with the MEC network. The network certificate may indicate that the associated user device is authorized to connect to the MEC network. The associated user device may provide the network certificate to the MEC node to verify that the associated user device is authorized to connect to the MEC network.

In another example, the associated user device may receive a service certificate from a device associated with the service provider. The service certificate may indicate that the associated user device is an authenticated user of the application associated with the API. The associated user device may provide the service certificate to the MEC node to verify that the associated user device is an authenticated user of the application associated with the API.

In some implementations, the associated user device may generate a user certificate based on a combination of the device certificate and login credentials for a user. To request access to the MEC network, the associated device may provide the device identifier, the user certificate, and/or login credentials to the MEC node.

In some implementations, the indication may include the device identifier, the certificate from another entity (e.g., the network certificate, the service certificate, and/or the like), an indication of APIs that may be used in a peer-to-peer connection with the associated user device, an identification of MEC resources to which the associated user device may connect, and/or the like.

As shown by reference number 104, the MEC node may authenticate user devices associated with the indications of availability to communicate using the API. In some implementations, the MEC node may verify an identity of the associated user device, verify that the associated device is authorized to connect to the MEC network, and/or the like. In some implementations, the MEC node may verify the identity of the associated user device using a device identifier certificate challenge. The MEC node may verify that the associated device is authorized to connect to the MEC network by using the device identifier and/or the network certificate to look up an authorization status of the user device in a local data structure or to request an indication of the authorization status from another device, and/or the like.

The MEC node may determine a level of trust for each of the user devices. In some implementations, the level of trust may be based on a peer rating of prior peer-to-peer connections, a level of trust associated with the associated device identifier, and/or the like. In some implementations, the MEC node may allow indications of availability to communicate using APIs associated with sensitive applications for only user devices with a level of trust that exceeds a threshold.

Figure 1B:
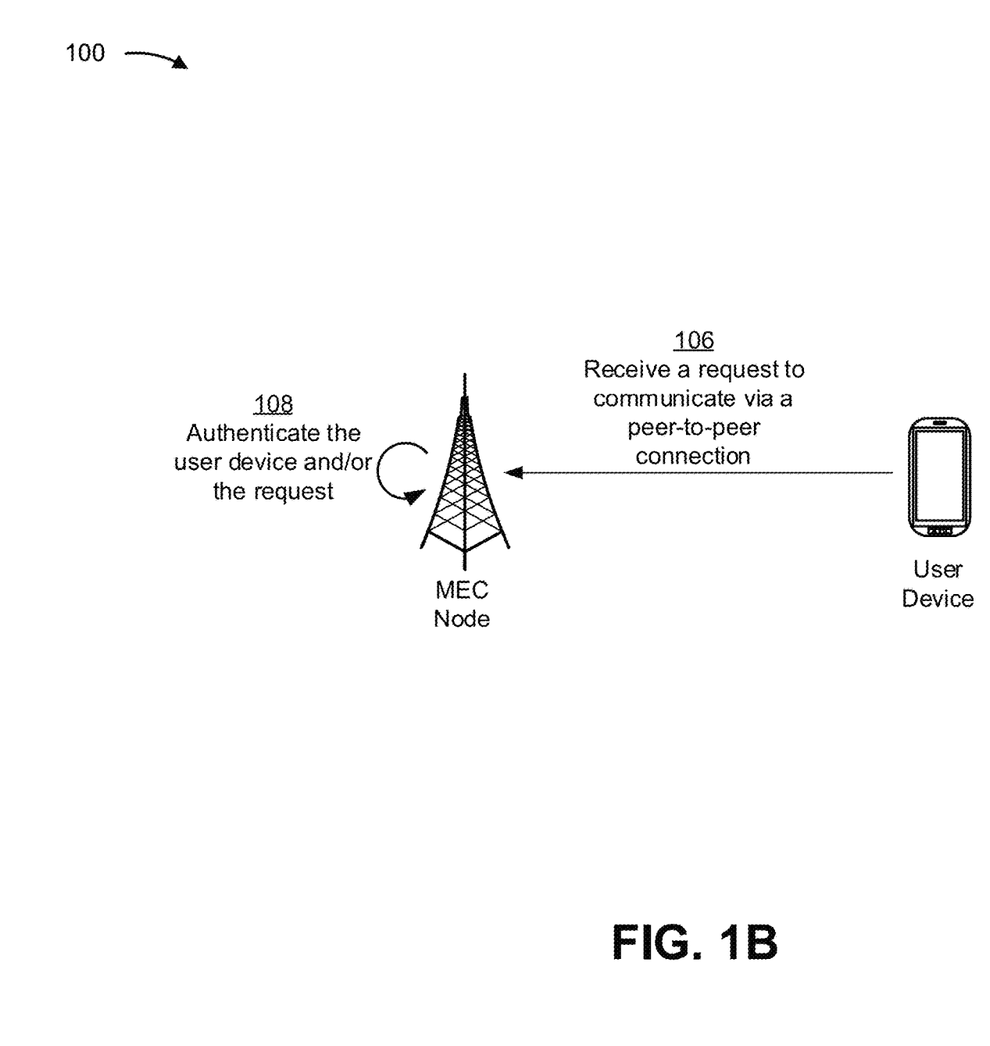

As shown in FIG. 1B, and by reference number 106, the MEC node may receive, from the user device, a request to communicate via a peer-to-peer connection. The request may include the device identifier of the user device. In some implementations, the request may identify the API requested to be used to communicate via the peer-to-peer connection.

The request to communicate via the peer-to-peer connection may comprise a request to stream data (e.g., real-time information) between the user device and the particular candidate device using the API. In some implementations, the request may indicate that the user device is looking for a connection with an unknown candidate device (which may be the particular candidate device). For example, the request may indicate that the user device is looking for a peer-to-peer connection with any device that is configured to communicate using an identified application and/or API (e.g., an unspecified partner for playing a multi-player video game). In some implementations, the request may include an identification (e.g., a device identifier, service certificate, and/or the like) of the particular candidate device.

In some applications, the data to be streamed between the user device and the particular candidate device may relate to an instance of the application hosted by one of the user device or the particular candidate device. For example, the data to be streamed may relate to a multi-player video game that is hosted by the user device. The user device may stream data to the particular candidate device, and the particular candidate device may stream data to the user device. By having the user device host the application, the user device may conserve computing resources of the MEC network that may otherwise have been used to host an instance of the application on the MEC resource and receive, process, and return data streams related to each of the user device and the particular candidate device within the MEC network.

As shown by reference number 108, the MEC node may authenticate the user device and/or the request. The MEC node may authenticate the user device by verifying an identity of the associated user device, as discussed above. The MEC node may authenticate the request by verifying that the associated device is an authenticated user of the application associated with the API. The MEC node may verify that the associated user device is an authenticated user of the application associated with the API by using the device identifier and/or the service certificate to look up a status of the user device in a local data structure or to request an indication of the status from another device, and/or the like. The MEC node may additionally verify that the associated device is authorized to connect to the MEC network, as discussed above.

Figure 1C:
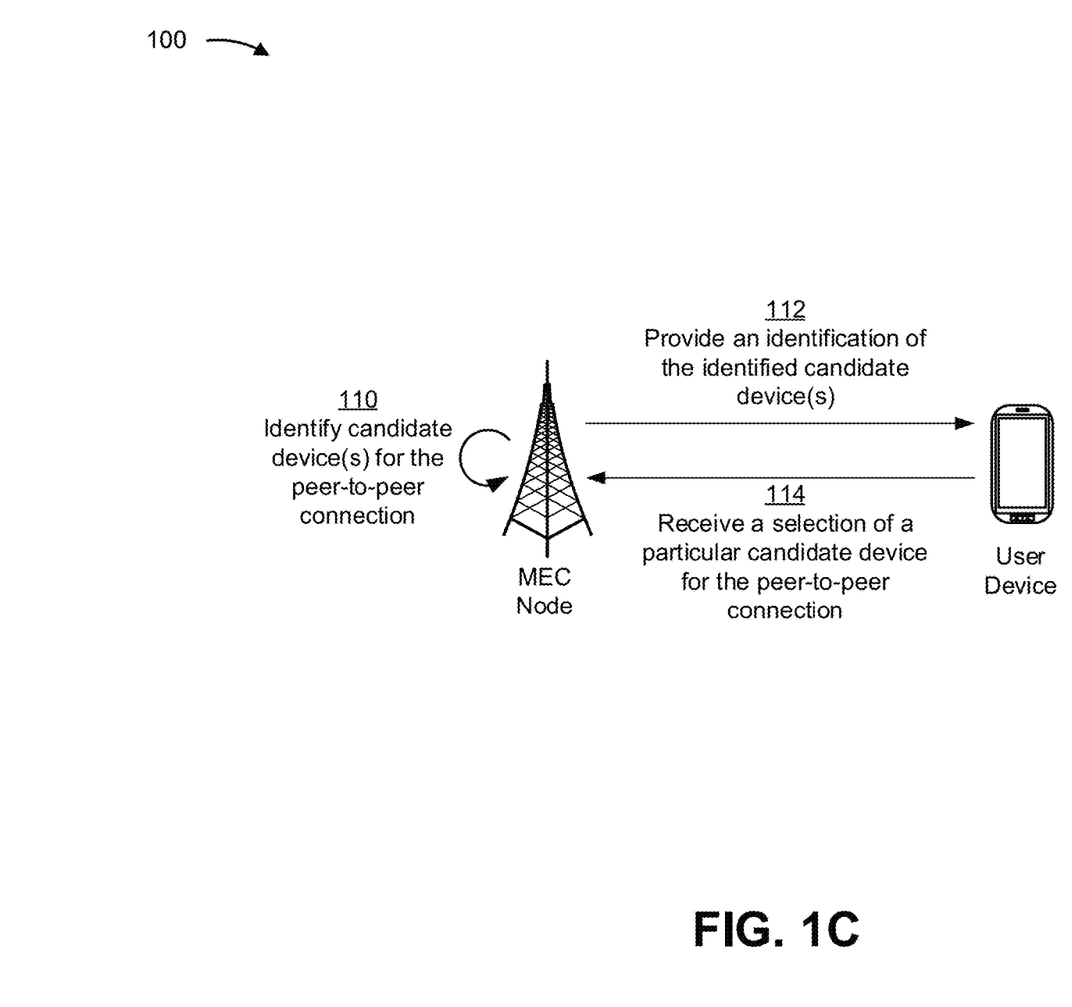

As shown in FIG. 1C, and shown by reference number 110, the MEC node may identify one or more candidate devices for the peer-to-peer connection. In some implementations, the MEC node may identify the one or mode candidate devices based on indications received from the one or more candidate devices indicating an availability to communicate using the API via a peer-to-peer connection. In some implementations, the MEC node may verify identities of the one or more candidate devices using associated device identifiers. Additionally, or alternatively, the MEC node may verify the one or more candidate devices as authenticated user device of the application, as described above.

In some implementations, the MEC node may filter candidate devices based on capabilities (e.g., hardware capabilities, software capabilities, communication capabilities, and/or the like) of the candidate devices. For example, the MEC node may identify candidate devices based on local computing resources (e.g., processors, memory, and/or the like), operating systems, relevant application version indicators, signal strengths as observed by the MEC node, communication resources (e.g., hardware and/or software that enables communication via various communication networks, protocols, bandwidths, and/or the like), and/or the like.

As shown by reference number 112, the MEC node may provide an identification of the one or more candidate devices that the MEC node identified. The MEC node may provide the identification via a notification using another API, a message (e.g., a text message, a media message, and/or the like), an interactive webpage, and/or the like. The notification may include an interface for receiving a selection of the particular candidate device (which may be one of the one or more candidate devices) for the peer-to-peer connection. In some implementations, the notification may include instructions for the user device to provide the selection in a separate communication.

As shown by reference number 114, the MEC node may receive the selection of the particular candidate device for the peer-to-peer connection. In some implementations, the selection may identify more than one of the candidate devices for a peer-to-peer connection with multiple user device. For example, the user device may request to host a multi-player video game, a group viewing of a video, and/or the like with three or more user devices.

Figure 1D:
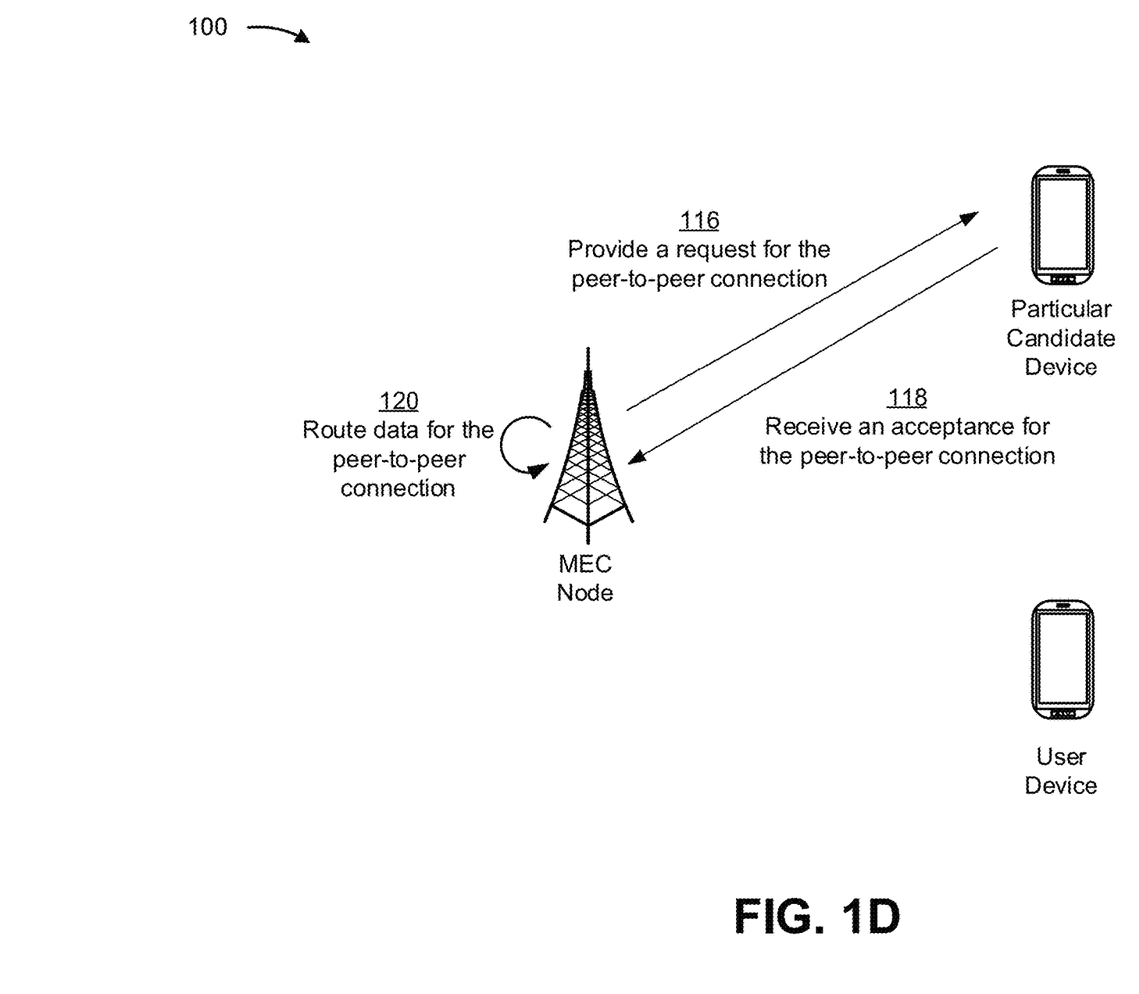

As shown in FIG. 1D, and by reference number 116, the MEC node may provide a request for the peer-to-peer connection to the particular candidate device. In some implementations, this request may originate at the MEC node or at the user device. For example, the selection of the particular candidate device may include a request to connect to the particular candidate device via the peer-to-peer connection using the API. The MEC node may modify the request or may simply route the request to connect to the particular candidate device to the particular candidate device. The MEC node may modify the request to indicate that the MEC node has verified the identity of the user device, the MEC node has verified the user device as an authenticated user device of the application associated with the API, and/or the like.

As shown by reference number 118, the MEC node may receive, from the particular candidate device, an acceptance from the peer-to-peer connection. For example, the particular candidate device may provide the acceptance via another API, an interactive webpage, a message, and/or the like. The MEC node may establish the connection between the particular candidate device and the user device based on the mutual acceptance for the peer-to-peer connection.

As shown by reference number 120, the MEC node may route data for the peer-to-peer connection. In some implementations, the data communicated via the peer-to-peer connection may comprise one or more streams of data using the API. The one or more streams of data may comprise real-time information relating to an instance of an application hosted by the user device or the particular candidate device. For example, the application hosted by the user device or the particular candidate device may relate to a video stream, an interactive digital activity (e.g., group-viewing a video), and/or an interactive multi-player video game.

In some implementations, the MEC node automatically, and without additional input from the user device and/or the particular candidate device, may match the user device and the particular candidate device for the peer-to-peer connection based on received indications of availability, security levels associated with the user device and/or the particular candidate device, and/or received requests to communicate via the peer-to-peer connection.

Figure 1E:
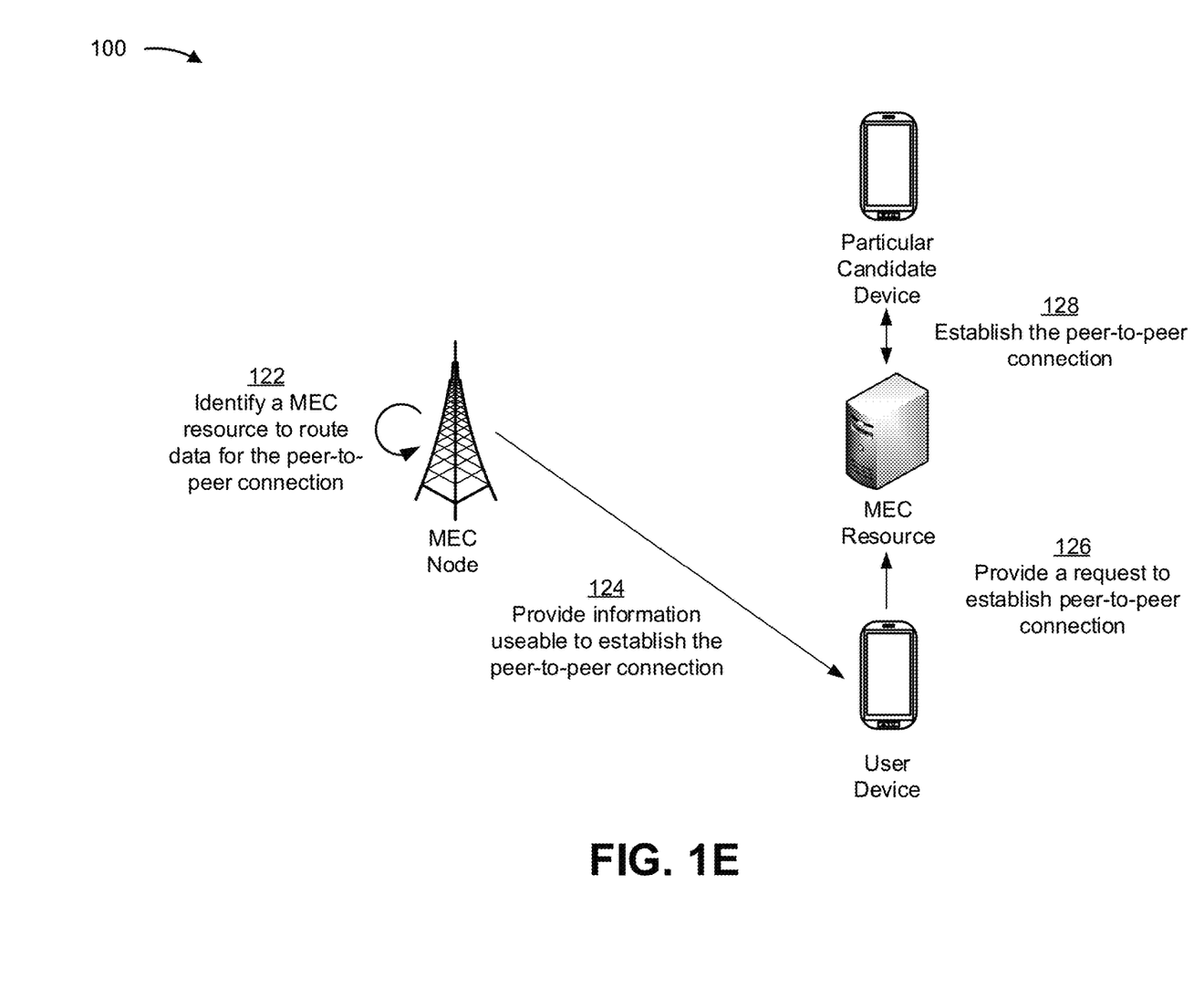

As shown in FIG. 1E, and by reference number 122, the MEC node may identify the MEC resource to route data for the peer-to-peer connection. In some implementations, the MEC node may identify the MEC resource at any point of the process described above. For example, the MEC node may identify the MEC resource after identifying the particular candidate device for the peer-to-peer connection without further input from the user device or the particular candidate device. In some examples, the MEC node may identify the MEC resource after receiving an acceptance for the peer-to-peer connection from the particular candidate device.

The MEC node may identify the MEC resources to route data for the peer-to-peer connection based on proximity of the MEC resource to the user device and/or the particular candidate device, quality of service requirements for the application associated with the API, a load of the MEC node, a signal strength of communications between the MEC node and the user device and/or the particular candidate device, and/or the like. In some implementations, the MEC resource may be accessible to a proper subset of a set of candidate devices that have access to the MEC node. For example, the range, communication hardware and/or software capabilities, and/or the like of the MEC resource may be less effective than that of the MEC node. The MEC resource may be capable of serving fewer user devices than the quantity of user devices that the MEC node is capable of serving.

As shown by reference number 124, the MEC node may provide information usable to establish the peer-to-peer connection, via the MEC resource, with the particular candidate device. The information may identify the MEC resource to facilitate the peer-to-peer connection, indicate that the MEC node has verified the identity of the user device, indicate that the MEC node has verified the user device and/or the particular candidate device as authenticated user devices of the application associated with the API, indicate that the MEC node has verified that the user device and/or the particular candidate device are authorized to connect to the MEC network, and/or the like.

In some implementations, the information may indicate how the user device may connect to the MEC resource. For example, the information may identify a network address of the MEC resource, a domain name system identifier to access the MEC resource, and/or the like. In some implementations, the information may identify a protocol, frequency bandwidth, component carrier, and/or the like for communicating with the MEC resource. For example, the information may identify a protocol associated with a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

In some implementations, the MEC resource may be the same device as the second device. For example, the user device may request a peer-to-peer connection with a candidate device that is hosting a live stream of data. The candidate device (e.g., the particular candidate device) may be provisioned to be a MEC resource and the user device may receive the live stream from the MEC resource via the peer-to-peer connection.

As shown by reference number 126, the user device may provide, to the network resources, a request to establish the peer-to-peer connection with the particular candidate device. The request may include a portion of the information provided by the MEC node to establish the peer-to-peer connection. For example, the request may identify the user device and the particular candidate device. The request may indicate that the MEC node has verified the user device and/or the particular candidate device as authenticated user devices of the application associated with the API, that the MEC node has verified that the user device and/or the particular candidate device are authorized to connect to the MEC network, and/or the like.

As shown by reference number 128, the MEC resource may establish the peer-to-peer connection between the particular candidate device and the user device based on the request from the user device. The MEC resource may route data related to the peer-to-peer connection as described above.

By using the MEC resource to facilitate the peer-to-peer connection, the MEC node may conserve computing resources and network resources of the MEC node, which may be in higher demand than the computing resources and network resources of the MEC node (e.g., if the MEC resource is accessible to a proper subset of user devices that have access to the MEC node). This may reduce congestion, interference, communication errors, and consumption of additional computing resources and/or network resources to recover from the communication errors.

In some examples, a service provider (e.g., a video game provider) may install an instance (e.g., an application) of an associated service on a device (e.g., a server, a set-top box, a gaming console, and/or the like). The device (e.g., the particular candidate device), may provide a communication, to the MEC node, indicating that the device is available to communicate via peer-to-peer connections to provide access to the associated service (e.g., via an API). If the MEC node receives, from the user device, a request to communicate via a peer-to-peer connection to access the associated service (e.g., via a locally installed application of the user device), the MEC node may match the request with the device. The MEC node may perform one or more actions described herein to establish the peer-to-peer connection between the user device and the device having the associated service installed.

In the examples describe above, the device having the associated service installed may provide a certificate to the MEC node so the MEC node may authenticate the device as an authentic (e.g., endorsed by the service provider, a provider of the MEC network, and/or the like) device for providing the associated service. The device may receive the certificate from another device associated with the service provider. The MEC node may verify the certificate by accessing a data structure of the provider of the MEC network, providing a request to authenticate to another device known to be associated with the service provider, and/or the like. In some implementations, the service provider may register the associated service with the provider of the MEC network and receive the certificate based on registering the associated service.

Authenticating the device having the associated service installed may prevent an unauthentic device, not associated with the service provider, communicating an indication that the unauthentic device is available to communicate via a peer-to-peer connection to provide the associated service. This may prevent using computing and/or network resources to create connections that are not authentic. This may also prevent using computing resources and/or network resources to discover and/or recover from malware, fraud, identity theft, and/or the like that may be perpetrated by a user of the unauthentic device.

In some examples, a device associated with a service provider may communicate an indication that the device is available to communicate via a peer-to-peer connection to provide a video and/or audio feed (e.g., previously recorded, substantially live, real-time, and/or the like). For example, the device may be a candidate device receiving captured video and/or audio from an audio/visual capturing device at an event such as a sporting event, a concert, and/or the like. The MEC node may receive, from the user device, a request to communicate via the peer-to-peer connection and may identify the service provider, an API associated with the service provider, and/or the like so the MEC node may identify the request as being related to the video and/or audio feed. The MEC node may perform one or more actions described herein to establish the peer-to-peer connection between the user device and the device. The device may perform one or more actions to allow access, for the user device, to the live video and/or audio feed. For example, the device may receive credentials, receive payment, and/or the like from the user device.

As indicated above, FIGS. 1A-1E are provided merely as one or more examples. Other examples are possible and can differ from what was described with regard to FIGS. 1A-1E. For example, in practice, there may be networks between the devices, additional devices, fewer devices, different devices, or differently arranged devices than those shown in FIGS. 1A-1E.

Figure 2:
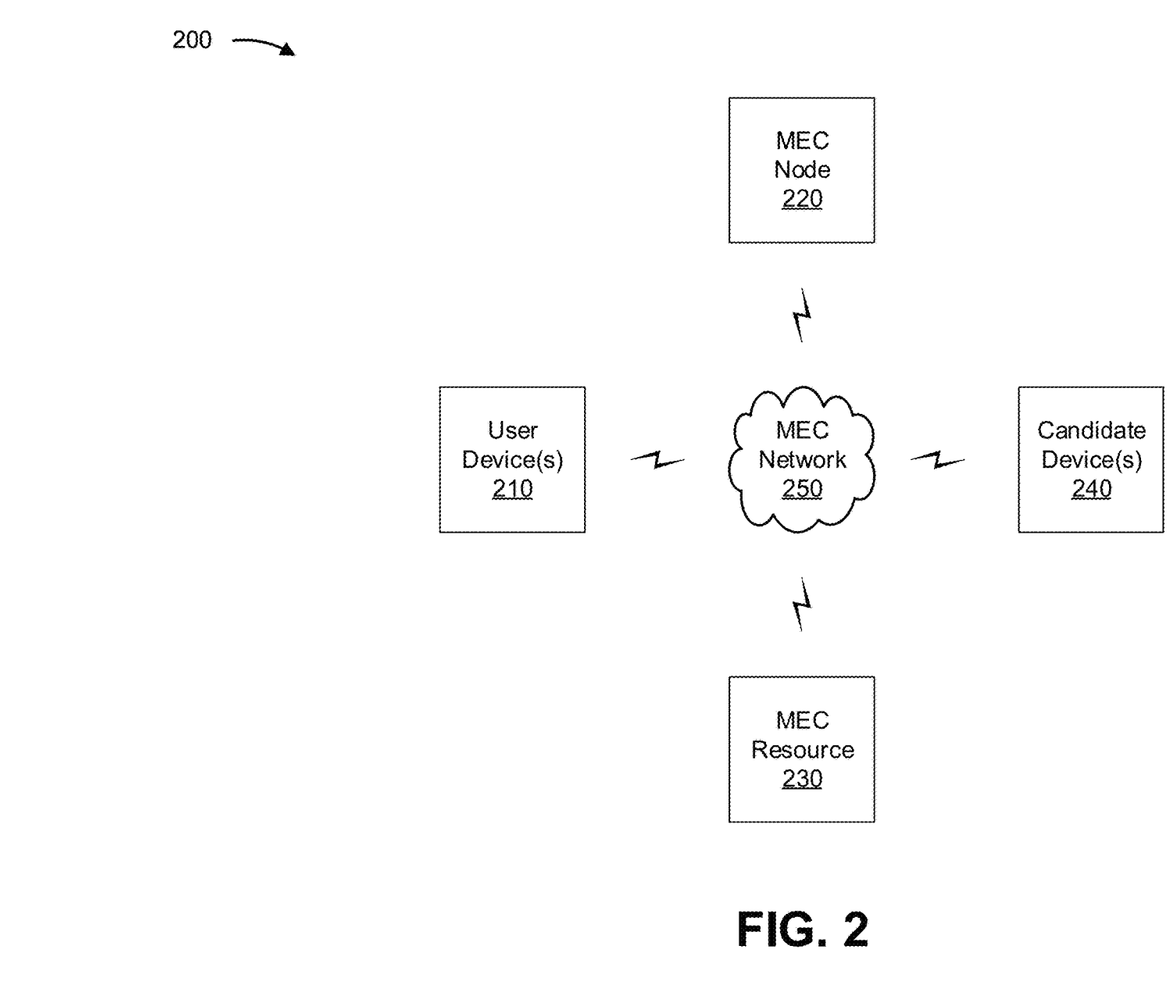
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include user device(s) 210, a MEC node 220, a MEC resource 230, and a MEC network 250. Devices of environment 200 may interconnect via wired connections, wireless connections, or a combination of wired and wireless connections.

User device(s) 210 includes one or more devices capable of receiving, generating, storing, processing, and/or providing information associated with a peer-to-peer connection. For example, user device(s) 210 may include a communication and/or computing device, such as a mobile phone (e.g., a smart phone, a radiotelephone, etc.), a laptop computer, a tablet computer, a handheld computer, a desktop computer, one or more servers, one or more server clusters, a gaming device, a wearable communication device (e.g., a smart wristwatch, a pair of smart eyeglasses, etc.), or a similar type of device.

MEC node 220 includes one or more devices capable of communicating with user device(s) 210 using a cellular radio access technology (RAT). For example, MEC node 220 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. MEC node 220 may transfer traffic between user device(s) 210 (e.g., using a cellular RAT), other base stations (e.g., using a wireless interface or a backhaul interface, such as a wired backhaul interface), and/or MEC network 250. MEC node 220 may provide one or more cells that cover geographic areas. Some MEC Nodes 220 may be mobile base stations. Some MEC nodes 220 may be capable of communicating using multiple RATs.

In some implementations, MEC node 220 may perform scheduling and/or resource management for user device(s) 210 covered by MEC node 220 (e.g., user device(s) covered by a cell provided by MEC node 220). In some implementations, MEC nodes 220 may be controlled or coordinated by a network controller, which may perform load balancing, network-level configuration, and/or the like. The network controller may communicate with MEC nodes 220 via a wireless or wireline backhaul. In some implementations, MEC node 220 may include a network controller, a self-organizing network (SON) module or component, or a similar module or component. In other words, a MEC node 220 may perform network control, scheduling, and/or network management functions (e.g., for other MEC nodes 220 and/or for uplink, downlink, and/or sidelink communications of user device(s) covered by the MEC node 220). In some implementations, MEC node 220 may include a central unit and multiple distributed units. The central unit may coordinate access control and communication with regard to the multiple distributed units. The multiple distributed units may provide user device(s) 210 and/or other MEC nodes 220 with access to MEC network 250.

MEC resource 230 includes one or more devices capable of communicating with user device(s) 210. MEC resources 230 may comprise hardware, firmware, or a combination of hardware and software and may be, for example, servers, security devices, devices implementing virtual machines, cloud computing resources, and/or the like. In some implementations, MEC resource 230 may include a communication and/or computing device, such as a MEC node (like MEC Node 220), a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. Some MEC resources 230 may be capable of communicating using multiple RATs. For example, MEC resource 230 may be capable of communicating using RATs relating to one or more cellular networks, a PLMN, a LAN, a WAN, a MAN, a telephone network (e.g., the PSTN), a private network, an ad hoc network, an intranet, the Internet, a fiber optic-based network, a cloud computing network, and/or the like, and/or a combination of these or other types of networks.

Candidate device(s) 240 includes one or more devices capable of receiving, generating, storing, processing, and/or providing information associated with a peer-to-peer connection. For example, candidate device(s) 240 may include a communication and/or computing device, such as a mobile phone (e.g., a smart phone, a radiotelephone, etc.), a laptop computer, a tablet computer, a handheld computer, a desktop computer, one or more servers, one or more server clusters, a gaming device, a wearable communication device (e.g., a smart wristwatch, a pair of smart eyeglasses, etc.), a set-top box, a casting stick (e.g., a high-definition media interface (HDMI) dongle), a cable card, or a similar type of device.

MEC network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a PLMN, a LAN, a WAN, a MAN, a telephone network (e.g., the PSTN), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
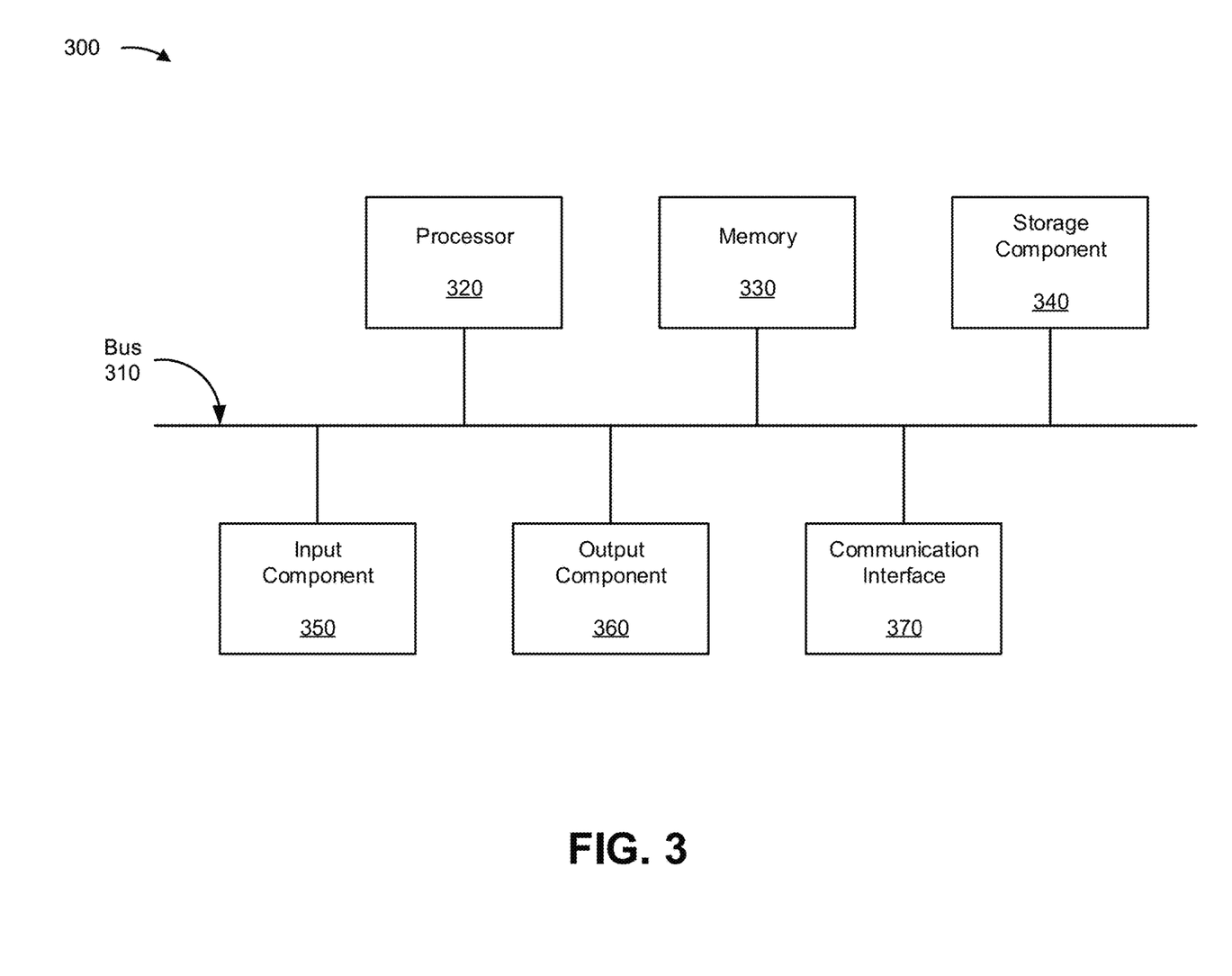
FIG. 3 is a diagram of example components of one or more devices of FIG. 2.

FIG. 3 is a diagram of example components of a device 300. Device 300 may correspond to user device(s) 210, MEC node 220, and/or MEC resource 230. In some implementations, user device(s) 210, MEC node 220, MEC resource 230, and/or candidate device(s) 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
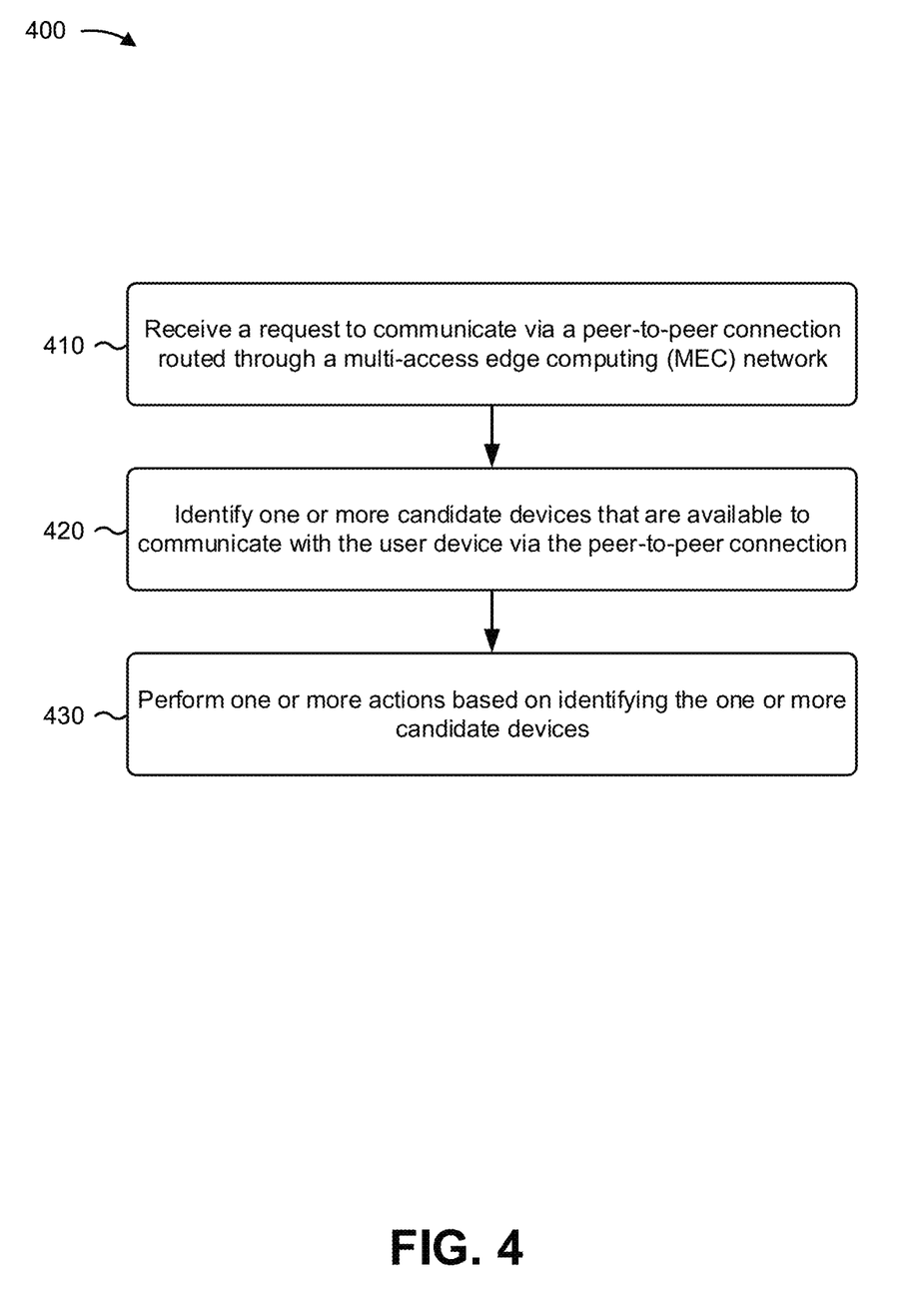
FIG. 4 is a flow chart of an example process for peer-to-peer data exchange via MEC.

FIG. 4 is a flow chart of an example process 400 for peer-to-peer data exchange via MEC. In some implementations, one or more process blocks of FIG. 4 may be performed by a MEC node (e.g., MEC node 220). In some implementations, one or more process blocks of FIG. 4 may be performed by another device or a group of devices separate from or including the MEC node, such as a user device (e.g., user device 210), a MEC resource (e.g., MEC resources 230), and/or the like.

As shown in FIG. 4, process 400 may include receiving a request to communicate via a peer-to-peer connection routed through the MEC network (block 410). For example, the MEC node (e.g., using processor 320, memory 330, storage component 340, input component 350, output component 360, communication interface 370 and/or the like) may receive, from a user device, a first request to communicate via a peer-to-peer connection routed through the MEC network, as described above.

In some implementations, the first request may comprise a device identifier that identifies the user device. The device identifier that identifies the user device may be a first device identifier and process 400 may include verifying an identity of the user device via the first device identifier and/or verifying an identity of the particular candidate device using a second device identifier that identifies the particular candidate device.

Additionally, or alternatively, the first request may identify an API requested to be used to communicate via the peer-to-peer connection. The API may be associated with an application installed or accessible to the first network node.

In some implementations, communication via the peer-to-peer connection comprises a real-time information (e.g., a stream of data) communicated using the API. For example, the stream of data using the API may include real-time information relating to an instance of an application hosted by the user device or the particular candidate device. The request to communicate via the peer-to-peer connection may comprise a request to stream data between the user device and the particular candidate device using the API.

Process 400 may further comprise verifying the user device as an authenticated user device of the application associated with the API by requesting, from a service provider of the application, an authentication of the user device as an authenticated user device of the application.

In some examples, process 400 includes receiving, from the user device before or in conjunction with the request to communicate via the peer-to-peer connection, a request to connect to the MEC network, determining that the user device is authorized to connect to the MEC network, and providing, to the user device, an acceptance to connect to the MEC network based on determining that the user device is authorized to connect to the MEC network.

As further shown in FIG. 4, process 400 may include identifying one or more candidate devices that are available to communicate with the user device using the API via the peer-to-peer connection (block 420). For example, the MEC node (e.g., using processor 320, memory 330, storage component 340, input component 350, output component 360, communication interface 370 and/or the like) may identify one or more candidate devices that are available to communicate with the user device using the API via the peer-to-peer connection, as described above.

In some implementations, process 400 may further comprise receiving one or more communications from the one or more candidate devices, with the one or more communications indicating that the one or more candidate devices are available to communicate using the API via the peer-to-peer connection. Additionally, or alternatively, the communication may indicate that the one or more user devices are available via the MEC resource.

As further shown in FIG. 4, process 400 may include performing one or more actions based on identifying the one or more candidate devices (block 430). For example, the MEC node (e.g., using processor 320, memory 330, storage component 340, input component 350, output component 360, communication interface 370 and/or the like) may perform one or more action based on identifying the one or more candidate devices, as described above.

For example, the one or more actions of process 400 may include providing, to the user device, an identification of the one or more candidate devices for selection to communicate via the peer-to-peer connection.

In some implementations, the one or more actions of process 400 may include receiving, from the user device, a selection of a particular candidate device of the one or more candidate devices to communicate via the peer-to-peer connection.

In some examples, the one or more actions of process 400 may include providing, to the particular candidate device, a second request to communicate via the peer-to-peer connection, wherein the second request identifies the user device, and wherein the second request identifies the API requested to be used to communicate a stream of data via the peer-to-peer connection. In some implementations, the second request identifies the user device. Additionally, or alternatively, the second request identifies the API requested to be used to communicate a stream of data via the peer-to-peer connection.

The one or more actions of process 400 may include receiving, from the particular candidate device, an acceptance to communicate via the peer-to-peer connection.

In some implementations, the one or more actions of process 400 may include routing data between the user device and the particular candidate device via the peer-to-peer connection.

The one or more actions of process 400 may include providing, to the user device, information useable by the user device to establish the peer-to-peer connection with the particular candidate device. In some implementations, the information may comprise an identification of a MEC resource usable to establish the peer-to-peer connection with the particular candidate device. In some examples, the information may comprise an identification of the particular candidate device. Additionally, or alternatively, the information may comprise an indication that the identity of the user device is verified by the MEC node and that the user device is verified as an authenticated user device of the application associated with the API.

In some implementations, the MEC resource may be accessible to a proper subset of user devices that have access to the MEC node.

Process 400 may include additional implementations, such as any single implementation or any combination of implementations described below and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a multi-access edge computing (MEC) node of a MEC network from a user device, a first request to communicate via a peer-to-peer connection routed through the MEC network;
identifying, by the MEC node, one or more candidate devices that are available to communicate with the user device via the peer-to-peer connection;
providing, by the MEC node, an identification of the one or more candidate devices for selection to communicate via the peer-to-peer connection;
receiving, by the MEC node, a selection of a particular candidate device of the one or more candidate devices to communicate via the peer-to-peer connection;
providing, by the MEC node and to the particular candidate device, a second request to communicate via the peer-to-peer connection;
receiving, by the MEC node from the particular candidate device, an acceptance to communicate via the peer-to-peer connection;
providing, by the MEC node and to at least one of the user device or the particular candidate device, information useable by at least one of the user device or the particular candidate device to establish the peer-to-peer connection; and
routing, by the MEC node, data between the user device and the particular candidate device via the peer-to-peer connection.

2. The method of claim 1, wherein the first request identifies an application programming interface (API) requested to be used to communicate via the peer-to-peer connection, and
wherein identifying the one or more candidate devices comprises identifying the one or more candidate devices based on the one or more candidate devices being available to communicate with the user device using the API via the peer-to-peer connection.

3. The method of claim 1, wherein the data comprises real-time information relating to an instance of an application hosted by the user device or the particular candidate device.

4. The method of claim 1, further comprising:
verifying the identity of the user device via a first device identifier that identifies the user device; and
verifying an identity of the particular candidate device using a second device identifier that identifies the particular candidate device.

5. The method of claim 1, further comprising requesting, by the MEC node from a service provider of an application associated with the API, an authentication of the user device as an authenticated user device of the application.

6. The method of claim 1, further comprising:
receiving, by the MEC node from the user device, a request to connect to the MEC network;
determining that the user device is authorized to connect to the MEC network; and
providing, to the user device, an acceptance to connect to the MEC network based on determining that the user device is authorized to connect to the MEC network.

7. The method of claim 1, further comprising receiving, by the MEC node, one or more communications from the one or more candidate devices,
wherein the one or more communications indicate that the one or more candidate devices are available to communicate via the peer-to-peer connection.

8. A multi-access edge computing (MEC) node, comprising:
one or more memories; and
one or more processors, communicatively coupled to the one or more memories, configured to:
receive, from a user device, a request to communicate via a peer-to-peer connection routed through a MEC network associated with the MEC node,
wherein the request comprises a device identifier that identifies the user device, and
wherein the request identifies an application programming interface (API) requested to be used to communicate via the peer-to-peer connection;
verify an identity of the user device using the device identifier;
verify the user device as an authenticated user device of an application associated with the API;
identify a particular candidate device that is available to communicate with the user device using the API via the peer-to-peer connection; and
provide, to the user device, information useable by the user device to establish the peer-to-peer connection with the particular candidate device.

9. The MEC node of claim 8, wherein the information useable by the user device to establish the peer-to-peer connection with the particular candidate device comprises:
an identification of a MEC resource usable to establish the peer-to-peer connection with the particular candidate device,
an identification of the particular candidate device, and
an indication that the identity of the user device is verified by the MEC node and that the user device is verified as an authenticated user device of the application associated with the API.

10. The MEC node of claim 9, wherein the MEC resource is accessible to a proper subset of a set of candidate devices that have access to the MEC node.

11. The MEC node of claim 8, wherein the request to communicate via the peer-to-peer connection comprises a request to transfer data in real-time between the user device and the particular candidate device using the API.

12. The MEC node of claim 11, wherein the data requested to be transferred between the user device and the particular candidate device relates to an instance of the application hosted by the user device or the particular candidate device.

13. The MEC node of claim 8, wherein the device identifier that identifies the user device is a first device identifier,
wherein the one or more processors are further configured to verify an identity of the particular candidate device using a second device identifier that identifies the particular candidate device.

14. The MEC node of claim 8, wherein the one or more processors are further configured to verify the user device as an authenticated user device of the application associated with the API by requesting, from a service provider of the application, an authentication of the user device as an authenticated user device of the application.

15. The MEC node of claim 8, wherein the one or more processors are further configured to receive a communication from the particular candidate device,
wherein the communication indicates that the particular candidate device is available to communicate using the API via the peer-to-peer connection, and
wherein the communication indicates that the particular candidate device is available via one or more MEC resources.

16. A non-transitory computer-readable medium storing instructions, the instructions comprising:
one or more instructions that, when executed by one or more processors, cause the one or more processors to:

receive, from a user device, a first request to communicate via a peer-to-peer connection routed through a multi-access edge computing (MEC) network;

identify a particular candidate device that is available to communicate with the user device via the peer-to-peer connection;

provide, to the particular candidate device, a second request to communicate via the peer-to-peer connection, receive, from the particular candidate device, an acceptance to communicate via the peer-to-peer connection;

provide, to at least one of the user device or the particular candidate device, information useable by at least one of the user device or the particular candidate device to establish the peer-to-peer connection; and route data between the user device and the particular candidate device via the peer-to-peer connection.

17. The non-transitory computer-readable medium of claim 16, wherein the data comprises real-time information relating to an instance of an application hosted by the user device or the particular candidate device.

18. The non-transitory computer-readable medium of claim 16, wherein the one or more instructions, when executed by the one or more processors, further cause the one or more processors to:

verify an identity of the user device using a first device identifier that identifies the user device; and verify an identity of the particular candidate device using a second device identifier that identifies the particular candidate device.

19. The non-transitory computer-readable medium of claim 16, wherein the one or more instructions, when executed by the one or more processors, further cause the one or more processors to:

receive, from the user device, a request to connect to the MEC network;

determine that the user device is authorized to connect to the MEC network; and provide, to the user device, an acceptance to connect to the MEC network based on determining that the user device is authorized to connect to the MEC network.

20. The non-transitory computer-readable medium of claim 16, wherein the one or more instructions, when executed by the one or more processors, further cause the one or more processors to receive a communication from the particular candidate device, and wherein the communication indicates that the particular candidate device is available to communicate via the peer-to-peer connection.

* * * * *